United States Patent [19]

Baucom

[11] Patent Number: 4,877,164
[45] Date of Patent: Oct. 31, 1989

[54] DEVICE FOR HOLDING CUPS, CANS, AND SIMILAR ARTICLES IN VEHICLES

[75] Inventor: Walter H. Baucom, Loudonville, N.Y.

[73] Assignee: Datamain 2000, Inc., Loudonville, N.Y.

[21] Appl. No.: 208,404

[22] Filed: Jun. 17, 1988

[51] Int. Cl.$^4$ .................. B60R 7/06; E05D 3/06; E05D 7/10
[52] U.S. Cl. ................. 224/42.44; 224/42.45 R; 16/341; 16/342; 16/354; 16/366
[58] Field of Search ............... 224/42.42, 42.45 R, 224/273, 200, 42.45 A, 277, 901, 42.43, 42.44; 211/74, 75, 76; 248/311.2; 403/349; 296/37.8; 16/332, 334, 341, 342, 354, 366, 386

[56] References Cited

U.S. PATENT DOCUMENTS

| | | | |
|---|---|---|---|
| 481,462 | 8/1892 | Benson | 403/349 |
| 1,271,039 | 7/1918 | Kiehler | 403/349 |
| 1,688,765 | 10/1928 | Veras | 224/42.45 R |
| 1,995,656 | 1/1934 | Stout | 224/42.43 |
| 2,939,585 | 6/1960 | Burgin | 224/42.45 R |
| 3,176,950 | 4/1965 | Hittesdorf | 224/42.45 R |
| 3,773,375 | 11/1973 | Nehls | 16/342 |
| 3,842,981 | 10/1974 | Lambert | 224/42.45 R |
| 4,488,669 | 12/1984 | Waters | 224/42.42 |
| 4,506,408 | 3/1985 | Brown | 16/386 |
| 4,724,986 | 2/1988 | Kahn | 224/42.42 |

FOREIGN PATENT DOCUMENTS 0861762 1/1971 Canada ................. 16/332

Primary Examiner—Henry J. Recla
Assistant Examiner—Robert M. Fetsuga
Attorney, Agent, or Firm—Joseph V. Claeys; Joseph C. Sullivan

[57] ABSTRACT

A holder for cups and similar articles which includes a plurality of elongated articulated members one of which members terminates at one end in an article holding means and at the other end in one-half of an intermeshing pair of joint elements which provide means for forming a positive detent-type joint means. One of the halves of the intermeshing pair of joint elements is in the form of a hub having a plurality of external teeth disposed thereon and the other half of the intermeshing pair of joint elements is in the form of a collar having a plurality of internal teeth arranged and constructed so that the collar fits over the hub element and the respective teeth intermesh to effect an adjustable positive detent joint means. Another of the members terminates at one end in an expandable plug mounting means arranged and constructed to form a secure connection within a hollow cylindrical opening, and terminates at its other end in the other half of the intermeshing pair of joint elements means are also provided retaining the respective halves of the intermeshing pair of joint elements together. The means for retaining the intermeshing pair of joint elements together includes a pair of spaced-apart leg members extending axially from the hub element and is provided with oppositely directed hook means which snap over and secure the collar half of the joint element to the hub half of the joint element.

11 Claims, 4 Drawing Sheets

4,877,164

DEVICE FOR HOLDING CUPS, CANS, AND SIMILAR ARTICLES IN VEHICLES

BACKGROUND OF THE INVENTION

1. Field of the Invention

The subject invention relates to a device especially adapted for use in vehicles such as automobiles, trucks, boats and the like for holding cups, cans and similar articles. More particularly, the invention relates to a new and improved device for holding cups, cans, and similar articles in vehicles. The device includes means for providing a rigid releasable mounting into an opening or receptacle of the vehicle, such as the cigarette lighter receptacle, and is adjustable and functions to hold the article in a horizontal, locked position regardless of the location or orientation of the opening.

2. Description of the Prior Art

It has long been recognized that it is desirable to provide a holder for cups and the like for use in vehicles especially automobiles, so that the vehicle operator is not required to continuously hold the cup while he is having his morning coffee or other beverage while on the move. The prior art is replete with cup holders some of which are constructed to hook over the window or door of the vehicle. Others are constructed with a clamping means which is adapted to be fitted to the dashboard or the glovebox cover of the vehicle. Some require that a suitable mounting base be secured to the dashboard or other mounting surface, such as by fasteners, adhesive, vacuum cups, or the like. The cup holding member is arranged to be mounted into the base so provided. None of such prior art arrangements have been entirely satisfactory and there remains a need for a reliable, universal device for holding cups, cans, and the like in vehicles.

SUMMARY OF THE INVENTION

It is an object of this invention to provide an adjustable holder arrangemet for holding cups, cans, and the like in vehicles such as automobiles, trucks, boats, and the like which is universal, simple, and which rigidly holds the article in a horizontal position.

Briefly stated, in accordance with one aspect of the invention there is provided a cup or can holder for vehicles which comprises at least two articulated members adjustably connected to each other at one of their extremities. In one particular preferred embodiment of the invention the articulated members are connected together by a positive detent-type joint means which provides for a secure non-rotatable joint while at the same time allowing for full adjustment of the relative positions of the members. At the other extremity of one of the members there is provided a suitable holder means for the cup or can. At the other extremity of the other member there is provided an expandable plug means which is arranged and constructed to fit within an opening, such as the opening formed by the vehicle's cigarette lighter receptacle, and to provide for a rigid, releasable connection with the vehicle opening. The device of the present invention provides for a simple, universal, rigid mounting with an already existing component of the vehicle. For example, the cigarette lighter is a universal, common component in all automobiles, and trucks, and is often also found as standard equipment or as an accessory in other vehicles such as boats either as a cigarette lighter or as a convenient electrical power receptical.

The invention thus provides for a convenient, simple, universal, rigid mounting with the already existing component, the vehicle cigarette lighter, while at the same time assuring that the cup or other article is held in a desired locked position for use (e.g. horizontal) regardless of the location or orientation of the vehicle opening.

DESCRIPTION OF THE PREFERRED EMBODIMENTS

Figure 1:
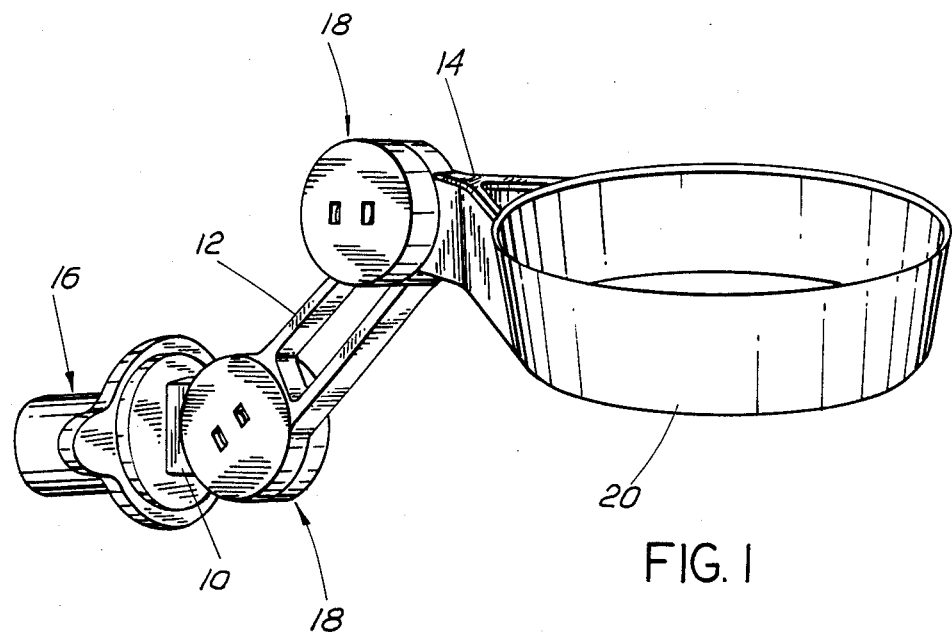
FIG. 1 is a perspective view of a cup (or other article) holding device in accordance with one embodiment of the invention and comprising three articulated or jointed members.

FIG. 1 is a perspective view of a cup holding device in accordance with one embodiment of the invention. As shown, the cup holding device comprises three articulated or jointed members 10, 12 and 14. Member 10 terminates at one end in an expandable plug mounting means, generally indicated at 16. Plug mounting means 16 is adapted to be rigidly secured into an opening, such as the cigarette lighter opening, of the vehicle. The other end of member 10 forms an adjustable detent-type joint, indicated generally at 18, with one end of the member 12. The other end of member 12 forms a similar adjustable detent-type joint 18 with one end of the member 14, the other end of which terminates in a ring-type cup holding means 20. In the embodiment illustrated in FIG. 1 the cup holding means 20 is shown as a hollow tapered cylindrical ring-type opening adapted to hold a typical paper or styrofoam drinking cup.

The expandable plug mounting means can be of any suitable type which can be fit into the cigarette lighter or other opening of the vehicle and then expanded by cam action or other means to form a secure rigid connection with the opening. Many such expandable plug means are well known in the art and any suitable of such known means may be employed. For example, such means may employ a spring action plug, a pressure-fit plug, a jam-fit plug, a compression-expansion plug, an expansion plug means comprising a resilient member and a cam-type inner plug means, or other suitable type.

Figure 3:
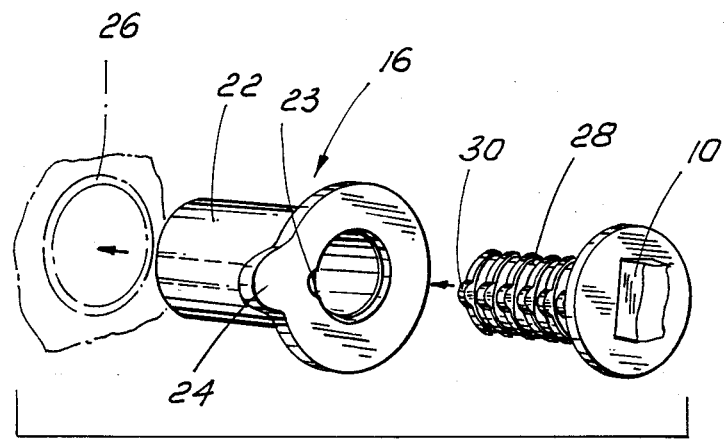
FIG. 3 illustrates an expandable plug mounting means in accordance with this invention.

In FIGS. 3A through 3C there is shown a preferred form of expandable plug mounting means 16. Mounting means 16 comprises a hollow cylindrical member 22 having a slot 23 formed therein. Member 22 is also provided with a tab 24. Member 22 is adapted to fit snugly within the cigarette lighter opening 26. The end of member 10 has a plug means 28 having a radially extending key 30. Plug means 28 is adapted to fit snugly within member 22 with the key 30 of plug means 28 mating with the slot 23 of member 22.

Member 10 is mounted to the vehicle in the following manner. The member 22 is inserted into the lighter opening or socket and while the tab 24 is held, the plug means 28 is inserted into member 22 with the key 30 fitting within the slot 23. While still holding tab 24, the plug means 28 is rotated 90° (clockwise) and the resulting cam action of key 30 securely locks plug means 28 into the cigarette lighter opening. The plug means 28 can be readily removed, if desired, by simply holding tab 24 and rotating plug means 28 in the opposite direction (counterclockwise) until the key 30 and slot 23 are aligned.

Figure 2:
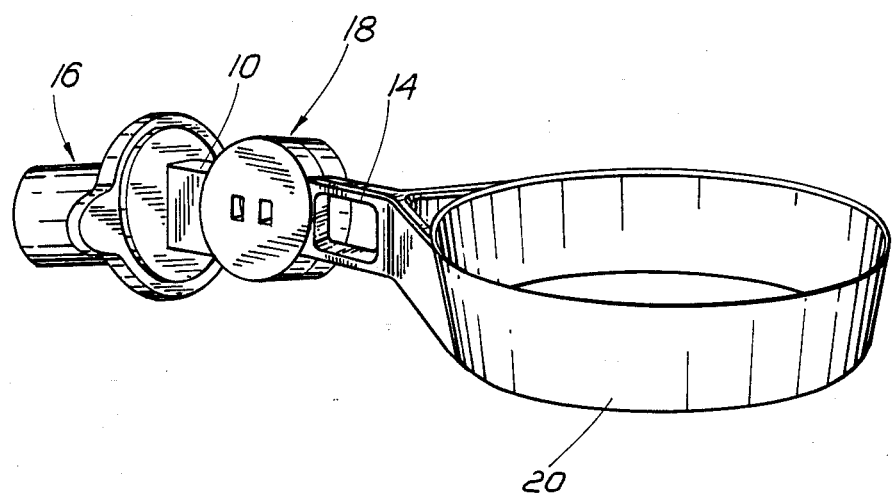
FIG. 2 is a perspective view of another embodiment of the invention comprising two articulated or jointed members.
Figure 6:
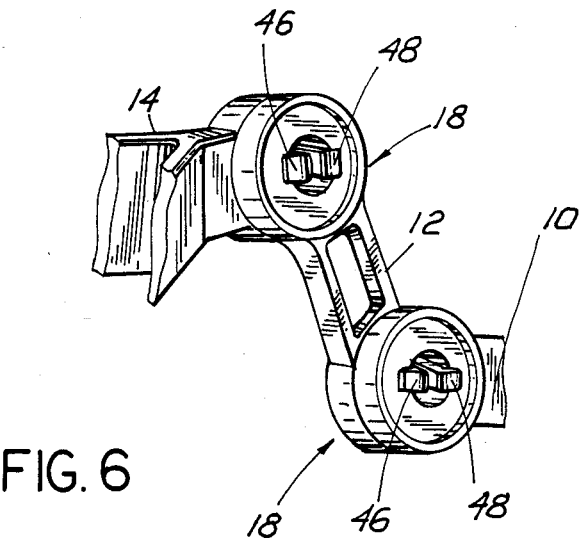

If the cigarette lighter is located in the vehicle ash tray compartment or in a floor or shift console, the cup holding device should be arranged with three articulated members as shown in FIG. 1. If the cigarette lighter is located in the vehicle dashboard the cup holder device can be arranged with only two articulated members as shown in FIG. 2.

To provide for the desired adjustment of the members 10, 12, and 14, while at the same time assuring that once adjusted the members will be prevented from rotating, there is provided a positive detent-type joint means 18. Any suitable positive detent-type joint means which will achieve this desired result may be employed.

Figure 4:
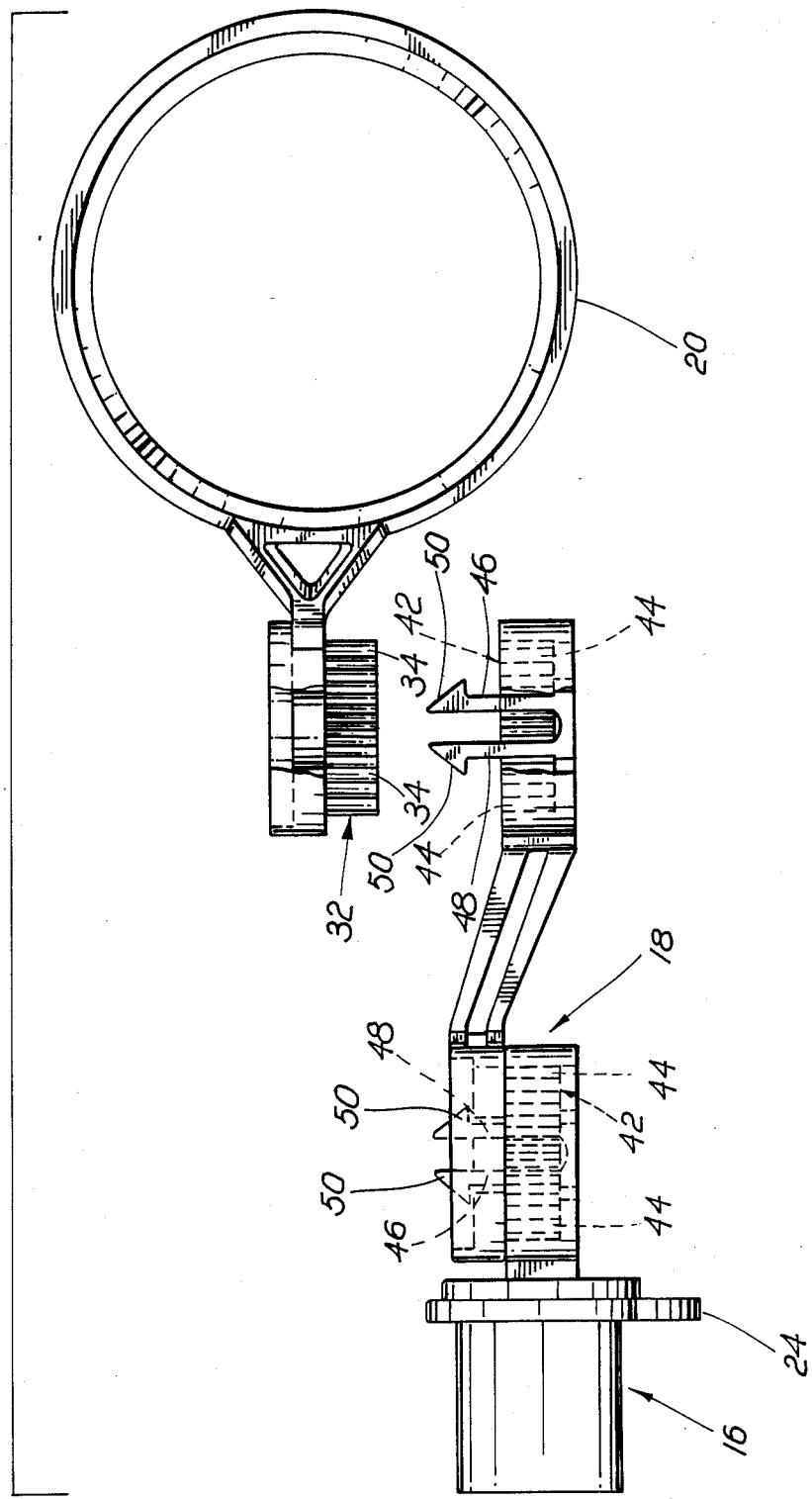
FIG. 4 shows an exploded view of a positive, detent-type joint connecting means in accordance with this invention.

A preferred positive detent-type joint means in accordance with this invention is shown in FIG. 4. As shown, one member of the joint means is provided with a hub 32 having a plurality of external teeth or splines 34. The other member of the joint means 18 is in the form of a collar 42 having a similar plurality of similar internal teeth or splines 44 which intermesh with the teeth 34 whereby when assembled at a desired relative position the members are positively locked against angular movement relative to one another. To retain the joint members together the hub is provided with extending legs 46 and 48 which terminate in hooks 50 which snap over the collar 42. The legs 46–48 obviate the need for a separate fastening means. Further, by squeezing the tips of legs 46 and 48 together the joint may be disassembled for removal or repositioning.

Figure 5:
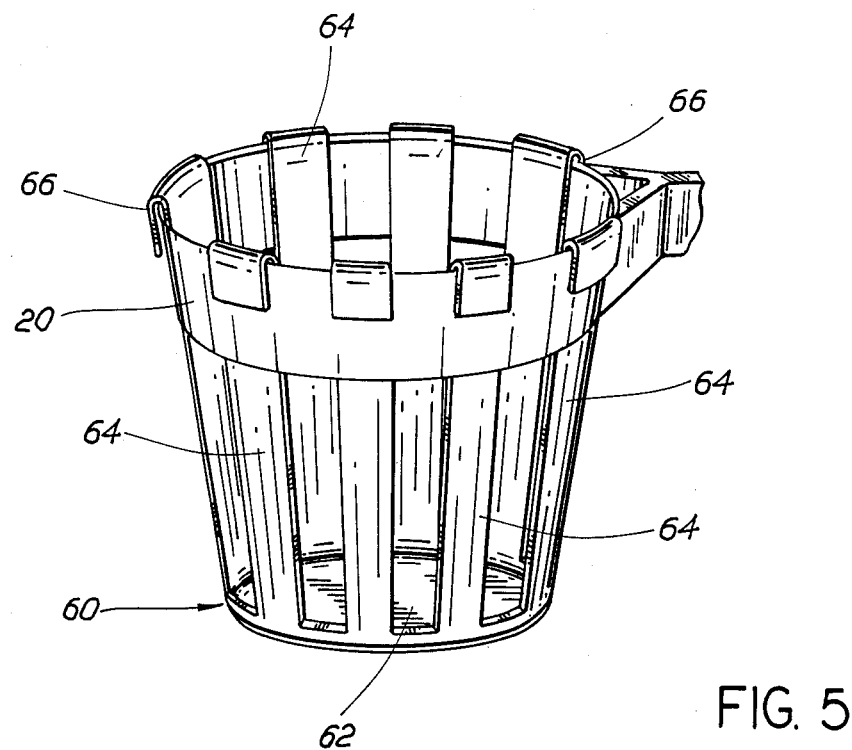
FIG. 5 illustrates an adapter means to readily convert an open ring-type cup holding means to a closed bottom can or bottle holding means in accordance with another embodiment of the invention.

FIG. 5 illustrates an adapter for use with the invention and for readily converting the open ring-type cup holding means 20 to a closed bottom holding means for holding a can, bottle or other article. As shown, the adapter 60 comprises a base 62 and a plurality of arms 64 extending upwardly therefrom. Each of the arms 64 terminates in a hook means 66 which is arranged and constructed to snap over and be held by the open ring-type cup holding means 20.

The terms and expressions which have been employed herein are used as terms of description and not of limitation, and there is no intention in the use of such terms and expressions of excluding any equivalents of the features shown and described. It is recognized that various modifications are possible and will readily occur to those of ordinary skill in the art. The appended claims are intended to cover all such modifications and equivalents as fall within their true spirit and scope.

What is claimed is:

1. A holder for cups and similar articles, comprising: a plurality of elongated articulated members one of which members terminates at one end in an article holding means and at the other end in one-half of an intermeshing pair of joint elements which provide means for forming a positive detent-type joint means, one of the halves of said intermeshing pair of joint elements being in the form of a hub having a plurality of external teeth disposed thereon and the other half of said intermeshing pair of joint elements being in the form of a collar having a plurality of internal teeth arranged and constructed so that said collar fits over said hub element and the respective teeth intermesh to effect an adjustable positive detent joint means, and another of said members terminates at one end in an expandable plug mounting means arranged and constructed to form a secure connection within a hollow cylindrical opening, and terminates at its other end in the other half of said intermeshing pair of joint elements; and means for retaining the respective halves of said intermeshing pair of joint elements together, said means for retaining said intermeshing pair of joint elements together including a pair of spaced-apart leg members extending axially from said hub element and being provided with oppositely directed hook means which snap over and secure the collar half of said joint element to the hub half of said joint element.

2. The holder recited in claim 1, wherein said expandable plug mounting means is arranged and constructed to form a secure connection within the cigarette lighter opening of a vehicle.

3. The holder recited in claim 2, wherein said expandable plug mounting means comprises a hollow cylindrical resilient member arranged and constructed to fit snugly within said cigarette lighter opening and a plug means having cam means thereon, said plug means arranged to fit within said resilient member and said cam means effecting secure connections between said resilient member and said cigarette lighter opening and between said resilient member and said plug means respectively.

4. The holder recited in claim 2, wherein said hollow cylindrical resilient member is provided with an internal slot and said plug means is provided with a radially extending key adapted to fit within said slot and to effect cam action and provide said secure connections by relative rotation between the resilient member and said plug means.

5. The holder recited in claim 1, comprising two elongated articulated members.

6. The holder recited in claim 5, wherein said expandable plug mounting means is arranged and constructed to form a secure connection within the cigarette lighter opening of a vehicle.

7. The holder recited in claim 1, comprising three elongated articulated members and wherein said third member is an interlinking member arranged and constructed to form an adjustable positive detent-type joint means with the respective ends of said other members, said interlinking member terminating at its opposite ends in an appropriate half of said intermeshing pair of joint elements so that the three members may be interconnected together through positive detent-type joint means to form a rigid adjustable assembly.

8. The holder recited in claim 7, wherein said expandable plug mounting means is arranged and constructed to form a secure connection within the cigarette lighter opening of a vehicle.

9. The holder recited in claim 7 wherein one end of said interlinking member terminates in a hub having a plurality of external teeth and a pair of spaced-apart legs extending axially from said hub and being provided with oppositely directed hook means, and the other end of said linking member terminates in a hollow cylindrical collar arranged and constructed to fit over said hub and being provided with a plurality of internal teeth which intermesh with the teeth on said hub to complete an adjustable positive detent-type joint with the appropriate ends of said other members.

10. A holder for cups and similar articles, comprising:
three adjustably interconnectable elongated articulated members,
a first of said members terminating at one end in an expandable plug mounting means arranged and constructed to form a secure, removable connection within a hollow cylindrical opening and terminating at its other end in a hollow cylindrical collar means having a plurality of internal teeth and a central bore,
a second of said members terminating at one end in an article holding means and at its other end in a hub means having a plurality of external teeth and a pair of spaced-apart, axially extending legs having oppositely directed hook means at the ends thereof, and
the third of said members being arranged and constructed to interconnect the first and second members together to provide a rigid, angularly adjustable assembly,
one end of said third member terminating in a hub means having a plurality of external teeth and a pair of spaced-apart, axially extending legs having oppositely directed hook means at the ends thereof, said hub means arranged and constructed to fit within the collar means of said first member with the external teeth of said hub means intermeshing with the internal teeth of said collar means and with the legs of said hub means passing through the central bore of said collar means so that the hook means at the ends of said legs snap over a portion of said collar means and retain the hub means of said third member and the collar means of said first member together,
the other end of said third member terminating in a hollow cylindrical collar means having a plurality of internal teeth and a central bore, said collar means of said third member arranged and constructed to fit over the hub means of said second member with the internal teeth of said collar means intermeshing with the external teeth of the hub means of said second member and the legs thereof passing through the central bore of said collar means so that the hook means at the ends of said legs snap over a portion of said collar means and retain the collar means of said third member and the hub means of said second member together.

11. The holder recited in claim 10, wherein said expandable plug mounting means is arranged and constructed to form a secure, removable connection within the cigarette lighter opening of a vehicle.

* * * * *